United States Patent
Longo

(10) Patent No.: US 12,502,115 B2
(45) Date of Patent: Dec. 23, 2025

(54) WEARABLE DEVICE FOR THE DETECTION OF CARDIAC SIGNALS, A SYSTEM COMPRISING SAID DEVICE AND A RELATIVE METHOD OF OPERATION

(71) Applicant: Policardio SRL, Rome (IT)

(72) Inventor: Marco Longo, Rome (IT)

(73) Assignee: Policardio SRL, Rome (IT)

( * ) Notice: Subject to any disclaimer, the term of this patent is extended or adjusted under 35 U.S.C. 154(b) by 1382 days.

(21) Appl. No.: 17/147,493

(22) Filed: Jan. 13, 2021

(65) Prior Publication Data

US 2021/0212624 A1    Jul. 15, 2021

(30) Foreign Application Priority Data

Jan. 13, 2020   (IT) .................. 102020000000451

(51) Int. Cl.
*A61B 5/282*   (2021.01)
*A61B 5/00*    (2006.01)
(Continued)

(52) U.S. Cl.
CPC .............. *A61B 5/282* (2021.01); *A61B 5/318* (2021.01); *A61B 5/346* (2021.01); *A61B 5/6823* (2013.01);
(Continued)

(58) Field of Classification Search
CPC ......... A61B 5/282; A61B 5/346; A61B 5/318; A61B 5/6823; A61B 5/257; A61B 2562/0209
See application file for complete search history.

(56) References Cited

U.S. PATENT DOCUMENTS

| | | | |
|---|---|---|---|
| 5,224,479 A * | 7/1993 | Sekine ................... | A61B 5/282 |
| | | | 600/389 |
| 5,307,818 A | 5/1994 | Segalowitz | |

(Continued)

FOREIGN PATENT DOCUMENTS

| EP | 0617915 | 10/1994 |
|---|---|---|
| WO | WO 2019/042486 | 3/2001 |

(Continued)

OTHER PUBLICATIONS

Rapporto di Ricerca e Opinione Scritta [Search Report and Written Opinion] Dated Oct. 7, 2020 From the Ministero Dello Sviluppo Economico, Direzione Generale Sviluppo Produttivo e Competitivita, Ufficio Italiano Brevetti e Marchi Re. Application No. IT 202000000451. (11 Pages).

*Primary Examiner* — Adam Z Minchella

(57) ABSTRACT

Described is a detection device (1) for detecting cardiac electrical signals, wearable by a patient, comprising a right lower electrode (11) and a left lower electrode (12), for detecting cardiac electrical potentials, positioned in alignment with each other on a first horizontal axis (x'), spaced apart from each other by a first distance (d1); a right upper electrode (13) and a left upper electrode (14), for detecting cardiac electrical potentials, positioned above said lower electrodes (11, 12), and being aligned with each other on a second horizontal axis (x''), parallel to said first horizontal axis (x'), and spaced from each other by a second distance (d2), greater than or equal to said first distance (d1); and a logic control unit (U), electrically connected to said electrodes (11, 12, 13, 14), wherein said logic control unit (U) is configured to receive a first bipolar lead (DI'), detected between said left upper electrode (14) and said right upper electrode (13); a second bipolar lead (DII'), detected between said left lower electrode (12) and said right upper electrode (13); a third bipolar lead (DIII'), detected between (Continued)

said left lower electrode (12) and said left upper electrode (14); a first unipolar lead (V1'), detected between said right lower electrode (11) and a first average potential, and a second unipolar lead (V2'), detected between said left lower electrode (12) and said first average potential, wherein said first average potential is equal to the average of detected signals, with respect to a reference potential, on said right upper electrode (13), on said left upper electrode (14) and on said left lower electrode (12). The invention also relates to a system comprising said device and a relative method of operation.

18 Claims, 14 Drawing Sheets

(51) Int. Cl.
    *A61B 5/318*     (2021.01)
    *A61B 5/346*     (2021.01)
    *A61B 5/257*     (2021.01)

(52) U.S. Cl.
    CPC ....... *A61B 5/257* (2021.01); *A61B 2562/0209* (2013.01)

(56) References Cited

U.S. PATENT DOCUMENTS

| | | |
|---|---|---|
| 6,532,379 B2 | 3/2003 | Stratbucker |
| 2006/0030782 A1* | 2/2006 | Shennib ................ A61B 5/332 600/509 |
| 2006/0224071 A1* | 10/2006 | Stewart ................ A61B 5/103 600/509 |
| 2012/0101396 A1* | 4/2012 | Solosko ................ A61B 5/332 600/509 |
| 2016/0029906 A1* | 2/2016 | Tompkins ............ A61B 5/6833 600/509 |
| 2018/0055397 A1* | 3/2018 | Al-Zaiti ................ A61B 5/366 |

FOREIGN PATENT DOCUMENTS

| | | |
|---|---|---|
| WO | WO 2008/148067 | 12/2008 |
| WO | WO 2017/165526 | 9/2017 |

* cited by examiner

WEARABLE DEVICE FOR THE DETECTION OF CARDIAC SIGNALS, A SYSTEM COMPRISING SAID DEVICE AND A RELATIVE METHOD OF OPERATION

RELATED APPLICATION

This application claims the benefit of priority of Italian Patent Application No. 102020000000451 filed on Jan. 13, 2020, the contents of which are incorporated herein by reference in their entirety.

FIELD AND BACKGROUND OF THE INVENTION

This invention relates to a wearable device for detecting cardiac signals.

The invention also relates to a system comprising said device.

The invention also relates to the method of operation of said device and of said system.

More specifically, the invention relates to a wearable and portable device for detecting cardiac electrical signals, and the relative system and method.

As is known, electrocardiography studies the electrical activity of the heart by modelling the heart muscle as an electrical dipole which varies in intensity and direction over time. In particular, this study is carried out by recording the electrical potential in the thorax and its variations using specially placed electrodes.

The position and the distribution of the electrodes on the patient's body affect the accuracy of the measurements.

Based on Einthoven's assumptions that the thorax can be modelled as a homogeneous system, ten preferred electrode positions have been identified to form twelve cardiac leads, that is, the right arm electrode RA, the left arm electrode LA, the left leg electrode LL, the right leg electrode RL, and six thoracic electrodes V1-V6 for respective intercostal spaces. In particular, the right leg electrode RL is usually used as a reference electrode, to remove noise from measurements and for electrical safety of the patient.

The twelve cardiac leads usually studied using these electrodes are:

three bipolar leads DI, DII, DIII, also called Einthoven triangle leads, as they measure the difference of potential on the sides of the imaginary equilateral triangle formed by a man lying with his arms outstretched and his ankles joined, having as vertices, respectively, the left arm electrode LA, the right arm electrode RA, and the left leg electrode LL, in which DI indicates the difference in electrical potential measured between the left arm electrode LA (positive pole) and the right arm electrode RA, DI=LA−RA;

DII indicates the difference in electrical potential measured between the left leg electrode LL (positive pole) and the right arm electrode RA, DII=LL−RA; and DIII indicates the difference in electrical potential measured between the left leg electrode LL (positive pole) and the left arm electrode LA, DIII=LL−LA;

three Goldberger augmented unipolar leads: aVR, aVL, aVF, which measure the difference of potential on the three bisectors of the Einthoven triangle, wherein, defining $V_w$ as the Wilson central terminal, equal to $V_w=1/3(RA+LA+LL)$, that is, the imaginary electrode at the centre of the thorax:

aVF indicates the potential difference at the bisector of the Einthoven triangle passing through the left leg electrode LL (positive pole), aVF=LL−1/2(RA+LA)=3/2 $(LL-V_w)$=DII−1/2DI;

aVR indicates the potential difference at the bisector of the Einthoven triangle passing through the right arm electrode (positive pole), aVR=RA−1/2(LA+LL)=3/2 $(RA-V_w)$=−1/2(DI+DII); and aVL indicates the potential difference at the bisector of the Einthoven triangle passing through the left arm electrode LA (positive pole), aVL=LA−1/2(RA+LL)=3/2 $(LA-V_w)$=DI−1/2DII; and six unipolar precordial Wilson leads, for the analysis of the electric dipole vector in the transversal plane of the thorax, measured respectively between each thoracic electrode V1-V6 (positive pole) and the imaginary electrode at the centre of the thorax, represented by the Wilson central terminal $V_w$.

Classical or standard leads allow the type of possible arrhythmias recorded to be known in detail, which may be useful to the doctor in determining pharmacological or ablative treatment.

By way of example, these leads can show whether ventricular extrasystoles occur and whether they originate from the right or left ventricle or from the outflow tract or base of the heart. This information makes it possible to hypothesise the arrhythmic mechanism, the dangerousness of the arrhythmia and the type of ablative approach required.

Further, the recording of an atrial flutter using these classic leads can help to understand whether or not it is isthmus-dependent, and based on this information to estimate the ablative approach.

Moreover, classic leads may show the presence of a branch block, whether right or left, or an atrial arrhythmia may be noted, or whether the person has a myocardial ischaemia. For this reason, limiting the number of leads available to medical personnel may result in the non-diagnosis of acute ischaemic events/myocardial infarctions.

In fact, by way of example, only the unipolar ECG leads make it possible to assess the circadian rhythm for the appearance of Brugada waves or an increase in the degree of early repolarisation or the appearance of fragments of the QRS complex.

Purely theoretically, each lead is nothing more than a projection of the heart's electric dipole vector in a particular direction, and it should be possible to use a simple linear transformation to go from a subset of leads, sufficient to identify the heart's dipole vector in its three components in space, to another lead.

Moreover, purely theoretically, the electrodes could be arranged in a different manner from that described, producing equivalent electrical potentials.

As seen, Goldberger's three augmented unipolar leads are indeed obtainable from a linear function between DI, DII and DIII.

However, due to the actual non-homogeneity of the thorax, the calculation of any of the three bipolar leads DI-DIII or any of the unipolar precordial Wilson leads V1-V6 by linear transformation of other measured leads is not always applicable.

Moreover, from an experimental point of view, alternative electrode configurations may be subject to greater noise, and therefore not all the configurations are possible.

A method for reconstructing the above-mentioned cardiac leads starting from measurements taken using five electrodes, including four electrodes for measuring cardiac electrical potentials and a reference electrode, has been described in a number of prior art papers (Nelwan et al. (2004), Reconstruction of the 12-Lead Electrocardiogram from Reduced Lead Sets, *J. Electrocardiol.* 37(1), 11-18).

According to this method, the four electrodes for measuring cardiac electrical potentials are, respectively, an upper electrode, to be positioned on an upper portion of the sternum, at the sternal manubrium, and three lower electrodes, positioned substantially on a same transversal plane of the patient, this transversal plane passing through a lower point of the sternum, at the xiphoid process.

In addition, the transformation matrix of the leads was derived from a finite element model of the human torso.

However, this approach has the following drawbacks:
the finite element model does not take into account patient-specific differences, as it is built with the parameters of an average thorax; however, as is well known, an individual patient's thorax can have very different dimensions from the average, as there is a high interpersonal variability;
the finite element model does not further take into account patient-specific differences regarding the composition of the body of the individual patient, that is, in terms of the percentage of fat mass, lean mass, or the dimensions of the lungs;
the positioning of the electrodes may be different from the ideal positioning with which the model has been constructed, introducing an additional error factor.

Moreover, as is known, finite element models are built by highly specialised engineers, and therefore, if one wanted to calculate a transformation suitable for a particular category of patients, or obtain a patient-specific transformation, the time and cost to derive such a transformation would be extremely great.

Portable electrocardiograph systems, such as those described in U.S. Pat. No. 9,717,433 B2, and U.S. Pat. No. 9,730,593 B2, are also known, which usually comprise only two thorax electrodes, including a reference electrode, for detecting a single cardiac lead.

These systems are particularly compact, however, they may not be sufficient for identifying problems associated with the heart for the reasons outlined above.

SUMMARY OF THE INVENTION

The aim of the invention is to overcome the drawbacks of the prior art.

In particular, the aim of the present invention is to provide a wearable and portable device for detecting, in real time, the main cardiac leads.

A further aim of the present invention is to provide a device which is easy for the patient to use, while guaranteeing accurate measurements.

Moreover, an aim of the invention to provide a system for remotely managing a patient's cardiac electrical signals.

Finally, the aim of the present invention is to provide a method of operating said system, in particular to perform a linear transformation for cardiac leads, which minimises the differences between patients and possible errors in electrode positioning.

An object of the invention is therefore to provide a detection device for detecting cardiac electrical signals, which is wearable by a patient, comprising a right lower electrode and a left lower electrode, for detecting cardiac electrical potentials, said right and left lower electrodes being positioned in alignment with each other on a first horizontal axis, spaced from each other by a first distance.

The device further comprises a right upper electrode and a left upper electrode, for detecting cardiac electrical potentials, said left and right upper electrodes being positioned above said lower electrodes, and being positioned aligned with each other on a second horizontal axis, parallel to said first horizontal axis, and spaced from each other by a second distance, greater than or equal to said first distance.

The device further comprises a logic control unit, electrically connected to said electrodes, wherein said logic control unit is configured to receive:
a first bipolar lead, detected between said left upper electrode and said right upper electrode,
a second bipolar lead, detected between said left lower electrode and said right upper electrode,
a third bipolar lead, detected between said left lower electrode and said left upper electrode,
a first unipolar lead, detected between said lower right electrode and a first average potential, and
a second unipolar lead, detected between said left lower electrode and said first average potential.

In particular, said first average potential is equal to the average of the signals detected, with respect to a reference potential, on said right upper electrode, on said left upper electrode and on said left lower electrode, said detected signals being therefore the cardiac electrical potentials detected with respect to said reference potential.

According to the invention, the logic control unit may be configured to receive or further calculate at least one of the following augmented unipolar leads:
a first augmented unipolar lead, between said left lower electrode and a second average potential, wherein said second average potential is equal to the average of the signals detected on said right upper electrode and on said left upper electrode with respect to said reference potential;
a second augmented unipolar lead, between said right upper electrode and a third average potential, wherein said third average potential is equal to the average of the signals detected on said left lower electrode and on said left upper electrode with respect to said reference potential; and
a third augmented unipolar lead, between said left upper electrode and a fourth average potential, wherein said fourth average potential is equal to the average of the signals detected on said left lower electrode and on said right upper electrode with respect to said reference potential.

Moreover, according to the invention, the pair of said right lower electrode and said right upper electrode and the pair of said left lower electrode and said left upper electrode may be arranged symmetrically to each other with respect to a vertical axis, orthogonal to said horizontal axes.

Further, according to the invention, said detection device may comprise at least one further electrode, and said logic control unit may be configured to receive at least a third unipolar lead, detected between said at least one further electrode and said average potential.

In particular, said at least one further electrode may be connectable in a removable fashion to said logic control unit, that is, via a suitable connector, preferably a comb connector, more preferably a comb connector having ten input channels.

Moreover, according to the invention, said logic control unit may be configured to use the potential detected on said right lower electrode as said reference potential.

Again according to the invention, said device may comprise a supporting element, applicable to the chest of thorax of said patient, for example being adhesive.

The supporting element may in turn comprise four housings, to house respectively said right lower electrode, said left lower electrode, said right upper electrode and said left upper electrode.

In particular, according to the invention, said logic control unit can be connected in a removable fashion to said supporting element.

Further, according to the invention, said logic control unit may be configured to transform the signals acquired by said electrodes into cardiac leads of a classical electrocardiogram, by means of a predefined transformation function, preferably a linear function.

Moreover, according to the invention, said detection device may comprise power supply means for its electricity supply, which may be, for example, a battery, and which may be located between said right upper electrode and said left upper electrode.

Finally, according to the invention, said device may comprise transceiver means, preferably a Bluetooth® transmission module, for transmitting, preferably automatically transmitting, the cardiac electrical signals of said patient.

A further object of the invention is a system for acquiring and processing cardiac electrical signals of a patient, comprising
a detection device according to the invention, in particular
a detection device comprising transceiver means, and a receiving device, connectable to said transceiver means of said detection device, said receiving device being configured to receive, transmit and/or store the cardiac electrical signals of a predefined patient.

Moreover, according to the invention, said receiving device may be a transceiver device and said system may comprise a remote central unit connectable to said transceiver device, configured to
receive cardiac electrical signals of said predefined patient from said transceiver, and
storing data associated with said cardiac electrical signals of said predefined patient, so as to make them available remotely.

In particular, said remote central unit can be configured to transform the leads acquired by said logic control unit into cardiac leads of a classical electrocardiogram, by means of a predefined transformation function.

Lastly, a specific object of the invention is a method of detecting cardiac leads on a thorax of a patient by means of at least one left lower electrode, right lower electrode, left upper electrode and right upper electrode, wherein said left lower electrode and said right lower electrode are arranged respectively at the fourth right and at the fourth left intercostal spaces, on the marginal-sternal line, and said left upper electrode and said right upper electrode are arranged above said left lower electrode and said right lower electrode, being aligned on a transversal line of said thorax, wherein said left lower electrode and said right lower electrode are spaced from each other by a first distance and said left upper electrode and said right upper electrode are spaced from each other by a second distance, greater than or equal to said first distance, said method comprising the following steps:
A1. acquiring a first bipolar lead, between said left upper electrode and said right upper electrode;
A2. acquiring a second bipolar lead, between said left lower electrode and said right upper electrode;
A3. acquiring a third bipolar lead, between said left lower electrode and said left upper electrode;
A4. acquiring a first unipolar lead, between said right lower electrode and a first average potential; and
A5. acquiring a second unipolar lead, between said left lower electrode and said first average potential,
wherein said first average potential is equal to the average of the signals detected, with respect to a reference potential, on said right upper electrode, on said left upper electrode and on said left lower electrode.

Moreover, the method according to the invention may further comprise at least one of the following steps:
A6. acquiring a first augmented unipolar lead, between said left lower electrode and a second average potential, wherein said second average potential is equal to the average of the signals detected on said right upper electrode and on said left upper electrode with respect to said reference potential;
A7. acquiring a second augmented unipolar lead, between said right upper electrode and a third average potential, wherein said third average potential is equal to the average of the signals detected on said left lower electrode and on said left upper electrode with respect to said reference potential; and
A8. acquiring a third augmented unipolar lead, between said left upper electrode and a fourth average potential, wherein said fourth average potential is equal to the average of the signals detected on said left lower electrode and on said right upper electrode with respect to said reference potential.

Moreover, the method according to the invention may also comprise the following step:
B. estimating at least one cardiac lead of a standard electrocardiogram by means of a transformation of the detected cardiac leads, using a predetermined transformation function.

In particular, said predetermined transformation function in said step B. may be a linear transformation function, preferably obtained by means of the Partial Least Square method.

Again according to the invention, said method may also comprise the following step:
C. sending said leads detected in the detecting steps and/or said at least one lead calculated in step B to a data receiving device.

Moreover, when said step B. is present, the method according to the invention may further comprise the following step:
D. receiving a modified transformation function, to be applied during said step B., and overwriting said predetermined transformation function.

Finally, the method according to the invention may be executable by means of a device according to the invention and/or by means of a system according to the invention.

BRIEF DESCRIPTION OF THE SEVERAL VIEWS OF THE DRAWINGS

The invention is now described, by way of example and without limiting the scope of the invention, with reference to the accompanying drawings, in which.

DESCRIPTION OF SPECIFIC EMBODIMENTS OF THE INVENTION

Figure 1:
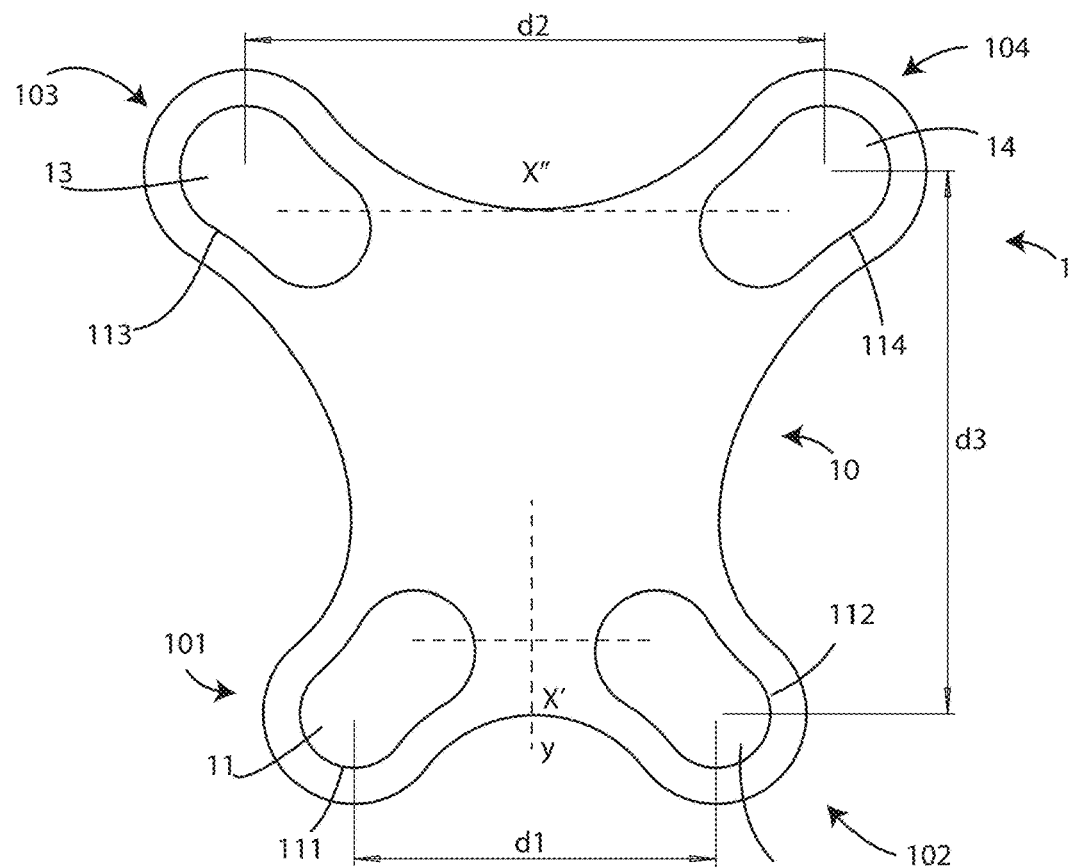
FIG. 1 is a front view of an embodiment of the detection device according to the invention comprising four electrodes.
Figure 2:
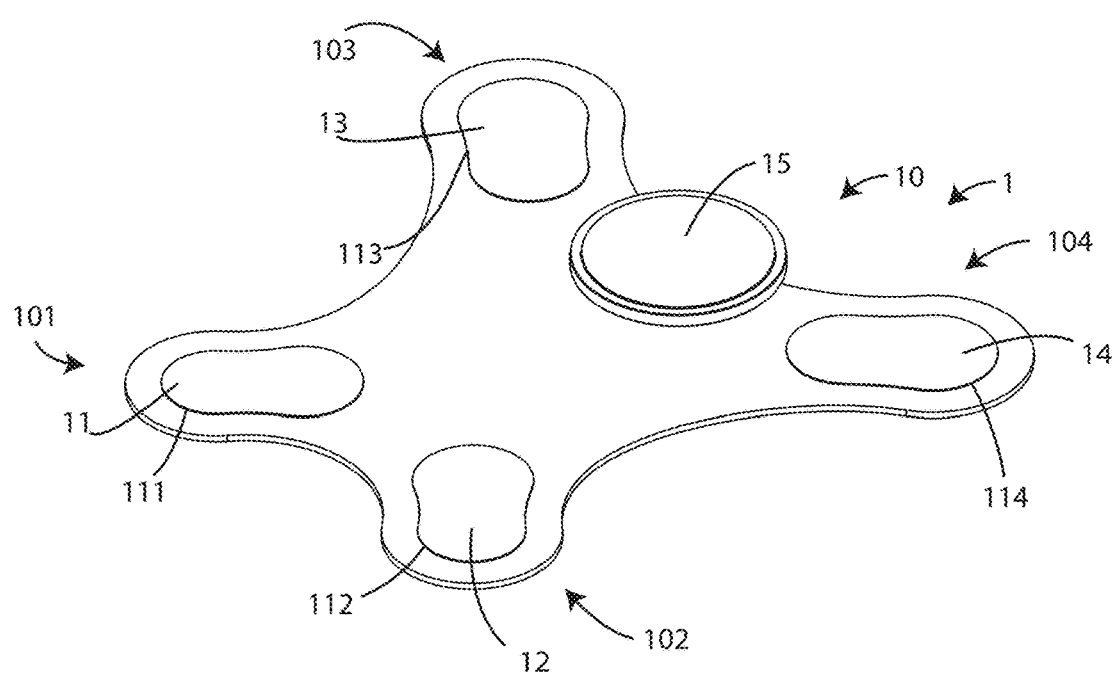
FIG. 2 is in an axonometric view of the detection device of FIG. 1, comprising a battery compartment.
Figure 3:
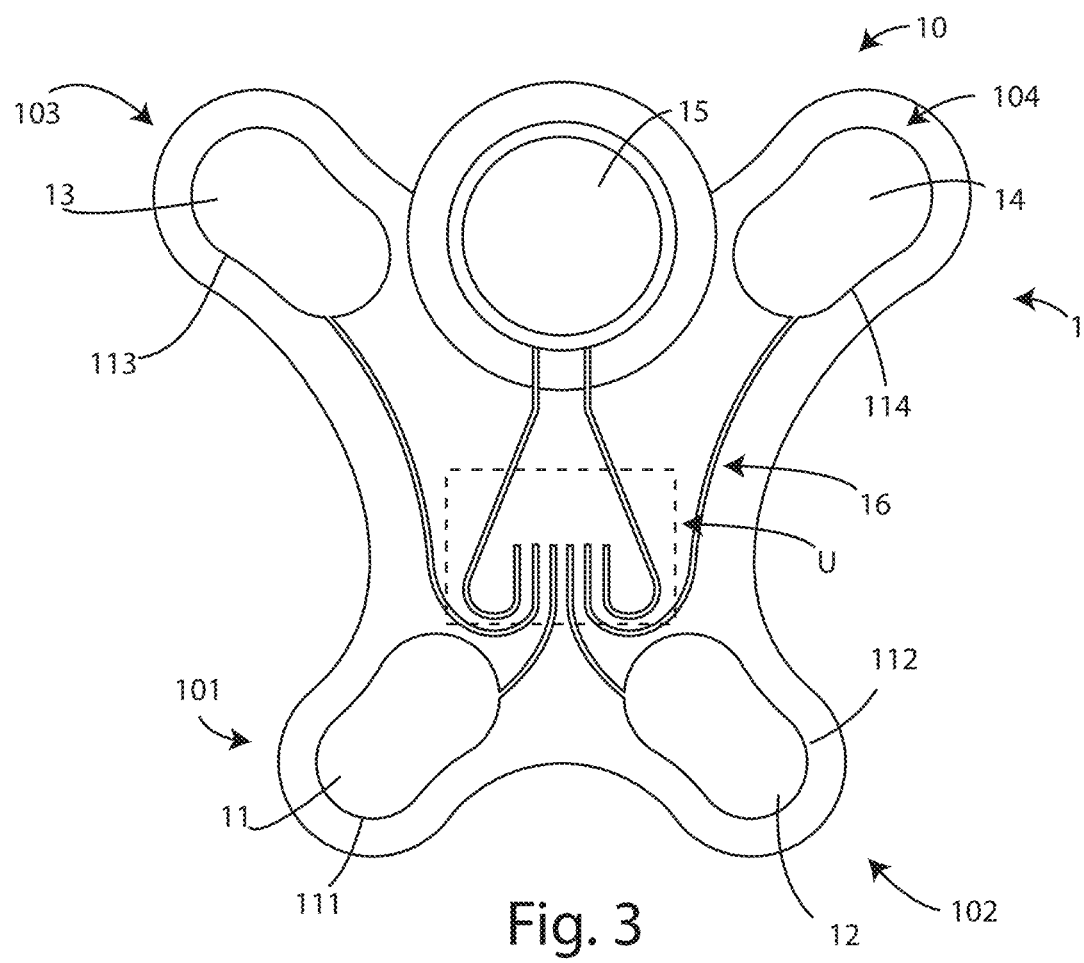
FIG. 3 is a front view of the detection device of FIG. 2, comprising a logic control unit and electrical connections between electrodes.
Figure 4:
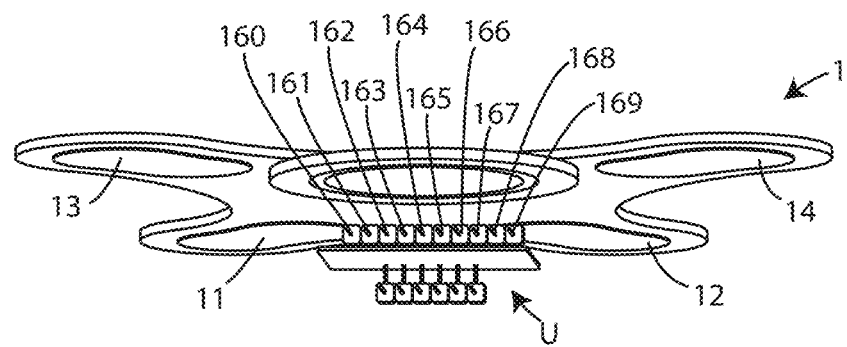
FIG. 4 is an upper perspective view of the device of FIG. 2, comprising a logic control unit.
Figure 5:
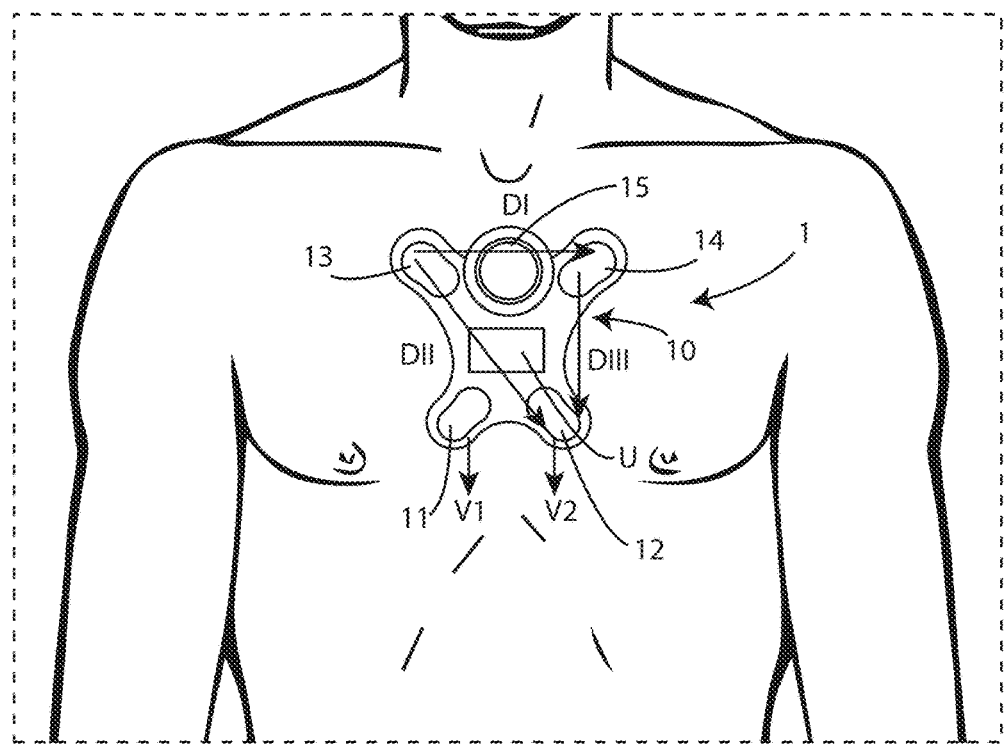
FIG. 5 is a front view of the device of FIG. 3 placed on the thorax of a patient, in which five measured cardiac leads are shown schematically.

With particular reference to FIGS. 1-5, reference numeral 1 denotes a device for detecting cardiac electrical signals according to the invention.

In particular, the detection device 1 is configured to detect at least five leads of the cardiac electrical dipole vector, including three bipolar leads DI', DII', DIII' and two unipolar leads V1', V2', by means of four electrodes 11, 12, 13, 14, as described below.

Preferably, the detection device 1 is configured to detect eight leads of the cardiac electrical dipole vector, comprising the five leads described above plus three augmented leads of the limbs aVR', aVF', aVL'.

Moreover, the detection device 1 can be integrated inside a system 100 comprising a data receiving device 2, preferably remotely accessible and configured to interact with further peripheral units, as described below.

In particular, the detection device 1 comprises a supporting element 10 for structural support of the device 1, comprising:
- four housings 111, 112, 113 and 114;
- four electrodes 11, 12, 13 and 14, each housed inside a respective housing 111, 112, 113, 114;
- a logic control unit U electrically connected to said electrodes 11, 12, 13, 14; and
- a battery 15, for powering said electrodes and said logic control unit U.

Moreover, the detection device 1 may comprise
- an LED, in particular a small multi-coloured LED, for example positioned on said supporting element 10, to indicate the operation of the detection device 1.

Lastly, the detection device 1 may comprise an accelerometer, in particular a three-axis accelerometer, connected to, or integrated in, said logic control unit U, to verify and/or signal the movements of the patient, and, if it is the case, report a fall.

The presence of the accelerometer can also advantageously allow the acquired cardiac signals to be filtered out from the noise deriving from the patient's own movement, as described below.

The supporting element 10 is preferably made of flexible material, which is able to adapt to the surface of a patient's thorax.

Moreover, the supporting element 10 has a lower face, configured to come into contact with the thorax of said patient, preferably comprising an adhesive surface, which is designed to be attached to the thorax of the patient in a predetermined position, as described in detail below.

The four housings 111, 112, 113, 114 are respectively:
a right lower housing 111, to house a right lower electrode 11;
a left lower housing 112 for housing a left lower electrode 12, wherein said left lower housing 112 is aligned with the right lower housing 111 on a first horizontal axis x';
a right upper housing 113, to house a right upper electrode 13; and
a left upper housing 114, for housing a left upper electrode 14, wherein said left upper housing 114 is aligned with the right upper housing 113 on a second horizontal axis x", parallel to the first axis x'.

The right lower housing 111 and the left lower housing 112 are spaced from each other by a first distance d1, preferably between 45 mm and 60 mm.

In particular, the right lower electrode 11 and the left lower electrode 12 can be advantageously positioned at the right and left fourth intercostal spaces, respectively, of a patient on the marginal-sternal line.

In other words, the right lower electrode 11 and the left lower electrode 12 can be advantageously positioned at the positions used to measure the first two unipolar thoracic leads V1 and V2 in a conventional electrocardiogram.

Moreover, the right upper housing 113 and the left upper housing 114 are spaced from each other by a second distance d2, greater than or equal to said first distance d1, preferably between 75 mm and 90 mm.

Finally, the right lower housing 111 and the left lower housing 112 are spaced from the right upper housing 113 and the left upper housing 114, respectively, by a third distance d3, preferably between 74 mm and 90 mm.

Figure 7:
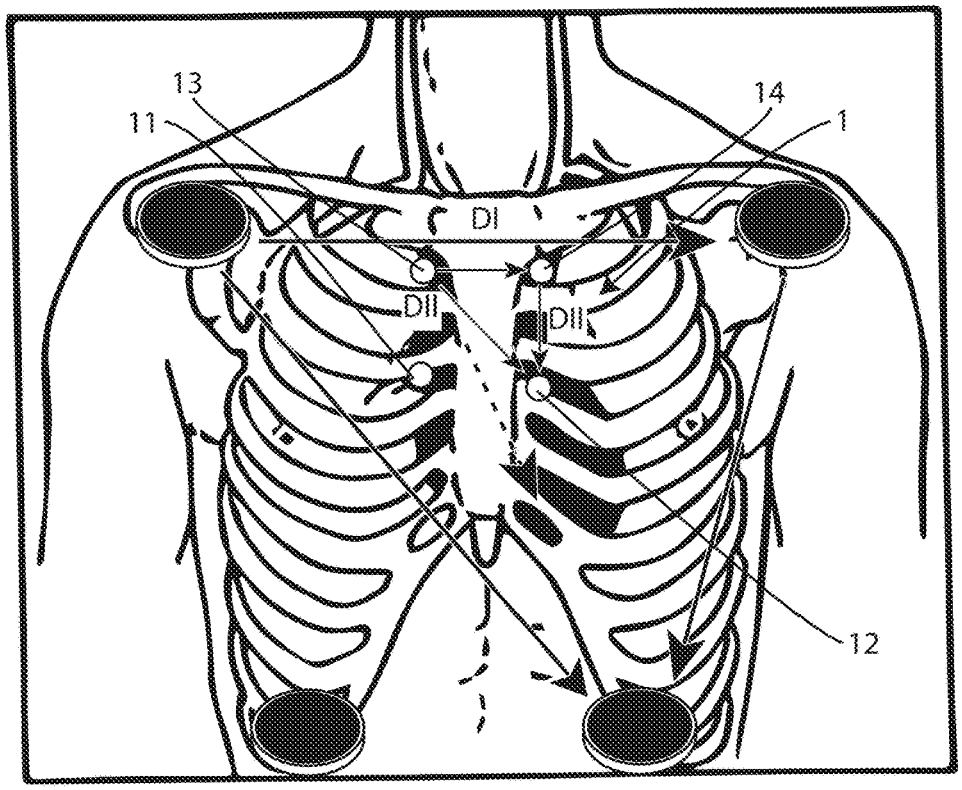
FIG. 7 is a schematic view of the positioning of the electrodes of a device according to the invention on a thorax model, in which the leads measurable by these electrodes are visible, in relation to a prior art Einthoven triangle.

In this way, the arrangement of the four electrodes 11, 12, 13, 14 on the supporting element 10 can advantageously be configured in such a way as to form a miniaturised Einthoven triangle, as for example shown in the example of FIG. 7.

In the particular embodiment shown in FIGS. 1-5, the supporting element 10 has a substantially "butterfly" shape, wherein each housing 111, 112, 113, 114 is positioned on a respective wing 101, 102, 103, 104 of said butterfly shape.

The supporting element 10 comprises, in fact, a right portion and a left portion. In particular, the right portion can be positioned on the right side of the thorax of the patient, and comprises a right lower wing (or protrusion) 101 and a right upper wing (or protrusion) 103. Similarly, the left portion is can be positioned on the left side of the thorax of the patient, and comprises a left lower wing (or protrusion) 102 and a left upper wing (or protrusion) 104. Moreover, said 'butterfly' shape is symmetrical with respect to a vertical y-axis dividing said right portion from said left portion.

However, according to alternative embodiments the shape of the supporting element 10 may be different from that just described, for example having a substantially U-shape, or a non-symmetrical shape.

Alternatively, the electrodes 11-14 may also not be positioned on any supporting element, but may be positioned directly on the body of the patient in the predefined positions.

Preferably, the electrodes 11, 12, 13, 14, are made of electrically conductive material, in particular metal. In addition, the electrodes 11, 12, 13, 14, at their lower face, which, when in use, faces the skin of the patient, may have a concave or inverted dome shape, configured to house inside it a greater quantity of conductive gel than the prior art electrodes, in such a way as to improve the electrical conductivity between the skin and the electrodes themselves. A further advantage of this arrangement is that it increases the distance between the skin and the respective conductive plates of the electrodes 11, 12, 13 and 14, thus significantly reducing the artefacts from movement.

The logic control unit U is configured to receive at least three bipolar leads DI', DII', DIII' and two unipolar leads V1', V2' detected by means of said four electrodes 11, 12, 13, 14.

In particular, the logic control unit U is preferably configured to receive three bipolar leads DI', DII', DIII', three augmented unipolar leads aVR', aVL', aVF', and at least two unipolar leads V1', V2', detected by means of said four electrodes 11, 12, 13, 14.

For this reason, the logic control unit U can be configured to calculate or receive:
a first bipolar lead DI', detected between said left upper electrode 14 and said right upper electrode 13;
a second bipolar lead DII', detected between said left lower electrode 12 and said right upper electrode 13;
a third bipolar lead DIII', detected between said left lower electrode 12 and said left upper electrode 14;
a first augmented unipolar lead aVF', acquired between said left lower electrode 12 and the average potential calculated between said upper electrodes 13, 14, the average potential being obtained by connecting in series said upper electrodes 13, 14 and measuring it with respect to said ground reference potential;
a second augmented unipolar lead aVR', acquired between said right upper electrode 13 and the average potential calculated between said left lower electrode 12 and said left upper electrode 14, the average potential being obtained by connecting in series said left lower electrode 12 and said left upper electrode 14 and measuring it with respect to said ground reference potential; and
a third augmented unipolar lead aVL', acquired between said left upper electrode 14 and the average potential calculated between said left lower electrode 12 and said right upper electrode 13, the average potential being obtained by connecting in series said left lower electrode 12 and said right upper electrode 13 and measuring it with respect to said ground reference potential; and
two unipolar leads V1', V2', acquired with respect to an average reference potential, that is, equal to the average of the signals recorded on the right upper electrode 13, on the left upper electrode 14, and on the left lower electrode 12, measured with respect to said ground reference potential.

In particular, the two unipolar leads V1', V2' are respectively:
a first unipolar lead V1', detected with respect to said right lower electrode 11; and
a second unipolar lead V2', detected with respect to said left lower electrode 12.

Moreover, the electrical potential measured directly on said right lower electrode 11 can advantageously be used as a ground reference potential.

Preferably, the acquisition of the cardiac leads DI', DII', DIII', V1', V2' is performed with a sampling frequency of between 500 samples per second and 20000 samples per second, and the logic control unit U may be configured to vary this sampling frequency, either automatically or semi-automatically or manually, according to the particular clinical needs.

Figures 8A, 8B:
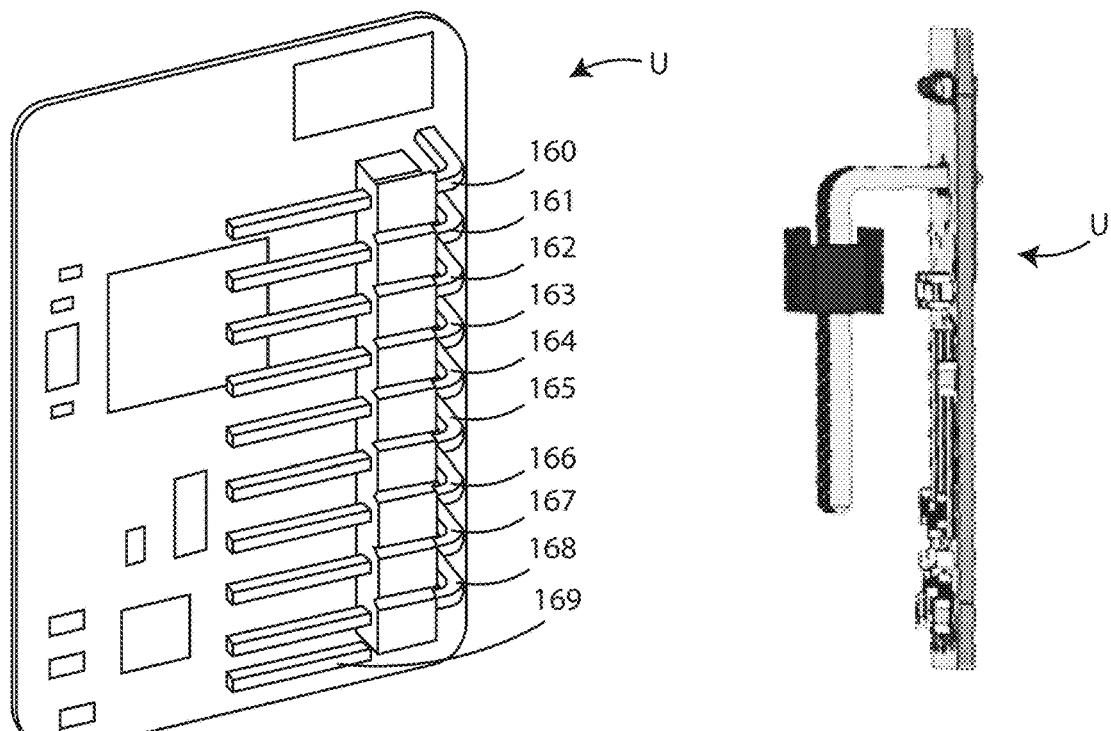
FIGS. 8A and 8B are a perspective view of the rear face and a side view, respectively, of a logic control unit connectable to or included in the device according to the invention.

Said logic control unit U may therefore comprise a microprocessor such as that shown in FIG. 8A to 8C, or a PLC or similar.

Preferably, said logic control unit U is a 12- or 24-bit microprocessor, more preferably 32-bit, with appropriate software pre-installed inside.

In particular, this software can apply a transformation function to the acquired leads DI', DII', DIII', V1', V2', in order to calculate the leads of a classical electrocardiographic examination from them, as explained in more detail below.

For this reason, it is advantageous to use the detection device 1 illustrated to obtain the leads of a classical electrocardiographic examination, without having to position any right or left leg electrode or in any case any electrode positioned below the thoracic electrodes.

Said logic control unit U can be advantageously reprogrammed to allow the transformation function to be modified, for example, on the basis of the characteristics of the patient.

Moreover, the logic control unit U can be configured to filter the acquired leads in order to have a clean signal at the input of said transformation function, for example, by means of appropriately applied filters in the frequency domain, after transforming the input signal by means of Fast Fourier Transform (FFT).

The acquired signals can be further processed by the logic control unit U to eliminate any drift in their average value before being transformed by means of said lead transformation function.

For example, the values relative to the impedance between skin and interface of the electrodes can be used to minimise any artefacts.

Moreover, the logic control unit may include a phase in which the acquired signal is filtered by taking into account the movements of the patient, for example, recorded by means of said accelerometers.

The logic control unit U may comprise transceivers for sending and, optionally, receiving data to/from remotely connectable devices. By way of example, the transceivers may be a Bluetooth® device, in particular a Low Energy Bluetooth® device, or a Bluetooth® device with automatic transmission, the function of which will be further explained below. In this case, the software for filtering and/or transforming the acquired data can be either inside the logic control unit U, as already described, or outside it, as explained in more detail below.

Said logic control unit U may further include means for storing data, such as, for example, a flash memory card.

In particular, said data storage media may be programmable means, which can be reprogrammed according to clinical needs.

For example, if a patient needs to be monitored over a long period of time, it will be possible to choose to record only a subset of the acquired or transformed leads, in such a way that they can be recorded for the entire period required.

Moreover, said logic control unit U may be coupled in a removable fashion to the supporting element 10, or by means of a suitable connector.

With particular reference to FIGS. 8A and 8B, said logic control unit U may further comprise suitable connectors, preferably positioned on a comb connector with ten "slots" or input channels, for inserting electrical connection means 16, in particular electrical cables 16, including:

a first input channel 160, for electrical connection with the positive pole of said battery 15;

a second input channel 161 for electrical connection with said right upper electrode 13;

a third input channel 162 for electrical connection with said right lower electrode 11;

a fourth input channel 163 for electrical connection with said left lower electrode 12;

a fifth input channel 164 for electrical connection with said left upper electrode 14 a sixth input channel 165 for electrical connection with the negative pole of said battery 15;

a seventh input channel 166, an eighth input channel 167, a ninth input channel 168 and a tenth input channel 169 for electrical connection with an accessory electrode, if any, as illustrated in more detail below.

Finally, said logic control unit U may include an internal clock, to determine the time and date of data acquisition.

Again with reference to FIGS. 1-5, the battery 15 is positioned centrally to said supporting element 10, on a relative upper portion, between said right upper electrode 13 and said left upper electrode 14.

In particular, the battery 15 may be a button cell battery of the CR3032 type.

According to alternative embodiments, said battery 15 may be positioned differently on the supporting element 10, for example centrally thereon.

Moreover, the battery 15 must be able to deliver adequate power to supply all the elements of the detection device 1, for at least 24 hours of operation, the power being preferably between 380 mAh and 400 mAh. For example, common supercapacitors may not be suitable.

Further, the battery 15 preferably has dimensions less than or equal to 30 mm×20 mm×3 mm.

Finally, the battery 15 is preferably a non-rechargeable battery and the detection device 1 may be a disposable device.

However, the battery 15 may also be a rechargeable battery, for example by wireless recharging.

The detection device 1 can be activated when it is attached to the thorax of a patient. In particular, such activation can advantageously be autonomous and not depend on the intervention of an operator, since it is possible to configure the detection device 1 in such a way that its circuits are closed on the battery 15 at the moment when it is placed on the patient.

Alternatively, the device can be activated by connecting an appropriate element to one of the connectors of the logic control unit U.

Figure 6:
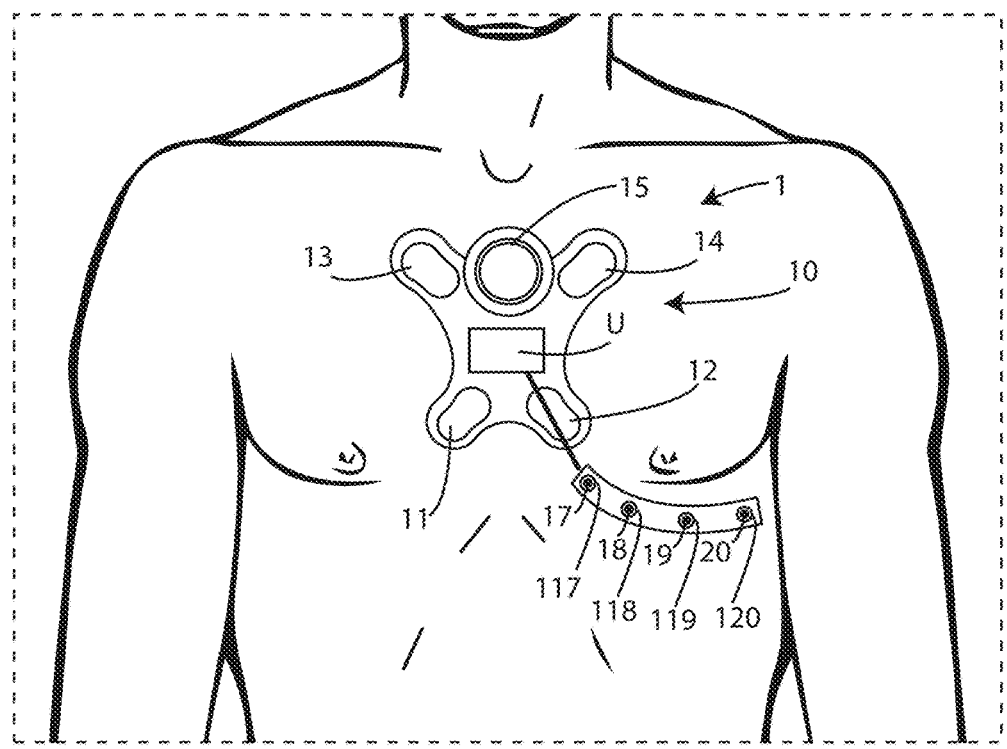
FIG. 6 is a front view of an alternative embodiment of the device according to the invention, placed on the thorax of a patient.

With reference in particular to FIG. 6, an embodiment is shown of the detection device 1 comprising all the technical features of the detection device 1 described above (to which the same numerical references are assigned), and further comprising four additional electrodes 17, 18, 19, 20 which can be positioned at the patient's left fifth intercostal space, in particular at the positions used to measure the remaining unipolar thoracic leads V3-V6 in a conventional electrocardiogram.

According to this embodiment, the logic control unit U is configured to detect respectively a third unipolar lead V3', measured between a fifth electrode 17, which can be positioned in the space between the marginal-sternal line of the fourth left intercostal space and the hemiclavicular line of the fifth left intercostal space, and said average potential;

a fourth unipolar lead V4', measured between a sixth electrode 18, which can be positioned at the fifth left intercostal space, on the hemiclavicular line, and said average potential;

a fifth unipolar lead V5', measured between a seventh electrode 19, which can be positioned at the fifth left intercostal space, on the anterior axillary line, and said average potential; and a sixth unipolar lead V6', measured between an eighth electrode 20, which can be positioned at the fifth left intercostal space, on the middle axillary line and said average potential.

Moreover, said further electrodes may be positioned on appropriate housings 117, 118, 119 and 120 of a second support 10', preferably an adhesive support 10', which may be connected in a removable fashion to said logic control unit U and to said battery 15, for example by means of said connectors 166-169.

However, according to alternative embodiments, the number of said additional electrodes 17-20 may vary, and there may also be only one additional electrode, for example positioned at the classic thoracic lead V3.

Moreover, these further electrodes 17-20 may be positioned on the positions corresponding to V3-V6 even if not positioned on a second supporting element 10'.

As already illustrated, the logic control unit U, or a software external to it, can be configured to estimate the classical cardiac leads $DI^{est}$, $DII^{est}$, $DIII^{est}$, $V1^{est}$-$V6^{est}$, starting from those acquired DI', DII', DIII', V1'-V6' by means of the detection device 1 described above.

With particular reference to FIGS. 10-18, the transformation function B which has been found to produce the best results is a linear transformation function obtained by means of the Partial Least Square method.

For this reason, classical or standard cardiac leads, as measured by a classical electrocardiogram, have been considered to be equal to:

$$S=[1P] \cdot B+e;$$

where:

S are the standard cardiac leads, comprising DI, DII, DIII, V1-V6, which can be stored in the form of a matrix having as number of columns N1, the number of leads acquired by a standard electrocardiograph and as number of rows N2 the number of time instants of the measurements;

the matrix [1P] is a matrix having as first column a vector of one, having dimension N2, and as further columns, the cardiac leads DI', DII', DIII', V1'-V6' acquired by the detection device 1, in particular, acquired at the same time as the standard cardiac leads S; specifically, the matrix P can be stored in the form of a matrix having as number of columns N1', the number of leads acquired by said detection device 1, and as number of rows N2 the number of time instants of the measurements, which are the same time instants of S;

e is the error between the estimated standard leads $S^{est}=$ [1P]·B and the standard leads S, which can be stored as a matrix having the same dimensions as S, and B is the linear transformation operator, which can be stored as a matrix of size N1'+1×N1, obtained by minimising the value of e using the Partial Least Square method.

This function was obtained from measurements taken on 45 clinically healthy patients.

For each patient, the leads of the S and P matrices for a total of three beats were acquired in order to calculate the B matrix. These leads were normalised by normalising the traces (the columns) in such a way as to have zero mean and unit variance.

The coefficients of the matrix B resulting from this linear interpolation are given in the table below.

TABLE 1

Matrix B coefficients calculated for a predetermined patient population.

| −6.23E−17 | 1.45E−16 | −2.45E−16 | −1.34E−16 | −4.86E−17 | −1.10E−17 | −8.62E−17 | −2.13E−16 | 4.92E−16 |
|---|---|---|---|---|---|---|---|---|
| −0.03362 | −0.03108 | 0.010143 | 0.005693 | 0.072026 | 0.048976 | −0.02712 | −0.06242 | −0.01701 |
| 0.101427 | 0.01939 | −0.10466 | 0.104592 | 0.197795 | 0.164321 | −0.10881 | −0.11529 | 0.034013 |
| 0.175564 | 0.056092 | −0.15868 | 0.144266 | 0.21636 | 0.189949 | −0.12958 | −0.10658 | 0.064239 |
| −0.0455 | −0.05055 | 0.005997 | 0.126179 | 0.097682 | 0.079186 | −0.00962 | −0.01662 | −0.09069 |
| 0.104922 | 0.008359 | −0.11945 | 0.20941 | 0.241007 | 0.277628 | 0.146466 | 0.118545 | 0.046806 |
| 0.10379 | 0.074664 | −0.05294 | 0.016565 | −0.07262 | 0.224988 | 0.969392 | 0.874663 | 0.295273 |
| 0.212475 | 0.152025 | −0.10973 | −0.17211 | −0.11157 | −0.05956 | 0.021113 | 0.058655 | 0.24432 |
| 0.252663 | 0.17647 | −0.13475 | −0.21294 | −0.11046 | −0.13084 | −0.26004 | −0.18125 | 0.228964 |
| 0.259375 | 0.183482 | −0.13608 | −0.24094 | −0.12228 | −0.1797 | −0.39963 | −0.30107 | 0.21305 |

Finally, the model was tested on further detections S and P acquired for a further nine beats of the same patients. The results are shown in FIGS. 10-18, where a very good approximation of the standard leads can be seen.

Advantageously, with respect to prior art models, the cardiac lead transformation function implemented within the logic control unit U, or in a remote central unit 3 external to it, takes into account the particular anatomical position of the electrodes 11-14 on the supporting device 10 and the additional electrodes 17-20, when present, for the acquisition of the cardiac leads by the detection device 1.

Moreover, it is easily reprogrammable on different patient populations.

In particular, it is possible to derive a patient-specific transformation matrix B, calibrated on measurements made on the same patient who must then wear the detection device 1 for the assessment of his/her cardiac electrical activity.

A further advantage of the detection device 1 illustrated is that with a small overall size it allows a clinical operator to analyse all the cardiac leads of a standard electrocardiogram.

This is particularly advantageous as standard leads, as mentioned above, allow particular cardiac problems to be detected by qualified clinical staff.

Figure 9:
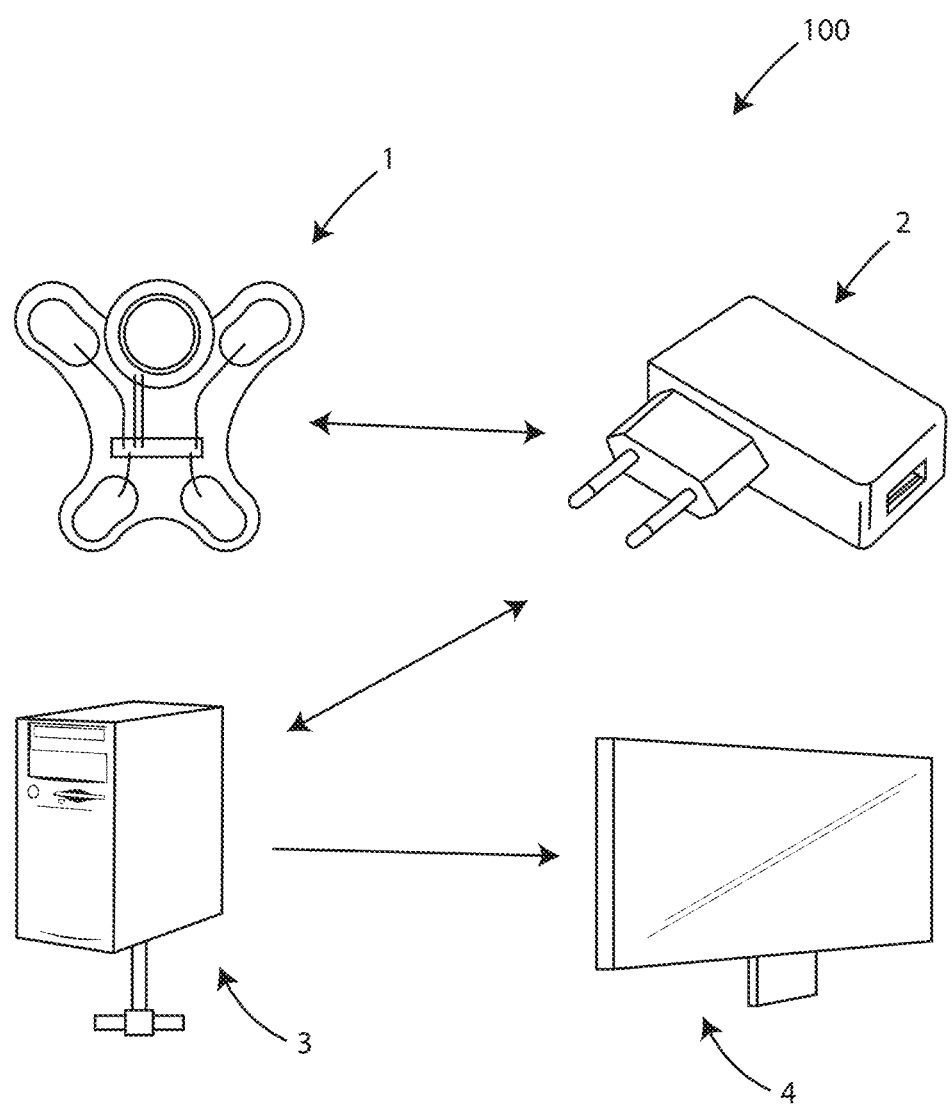
FIG. 9 is a schematic view of a system comprising a device according to the invention.
Figure 10:
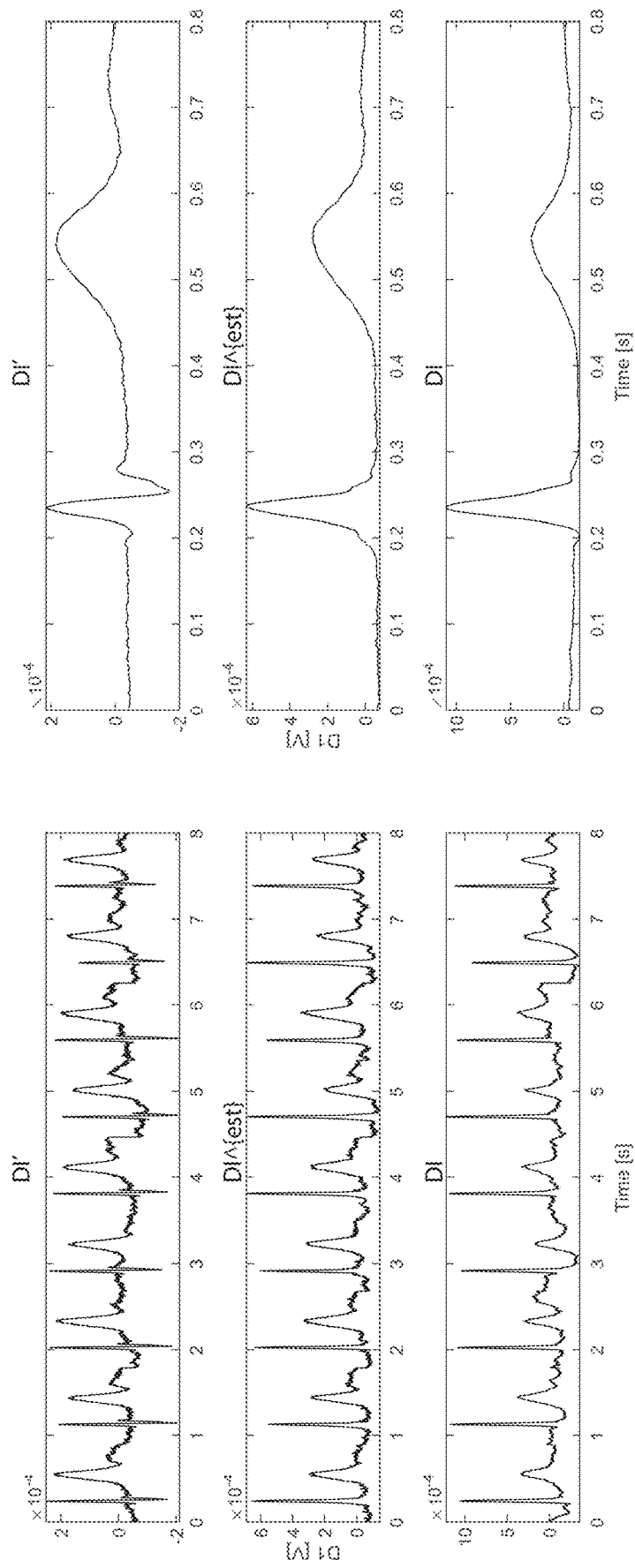
FIG. 10 shows a first lead DI' measured by the device according to the invention, the bipolar $DI^{est}$ lead, that is, the estimated classical bipolar DI lead, calculated by means of a lead algorithm according to the invention, starting from the leads measured by a device according to the invention, and the classical bipolar DI lead, measured on the same patient by means of prior art systems.
Figure 11:
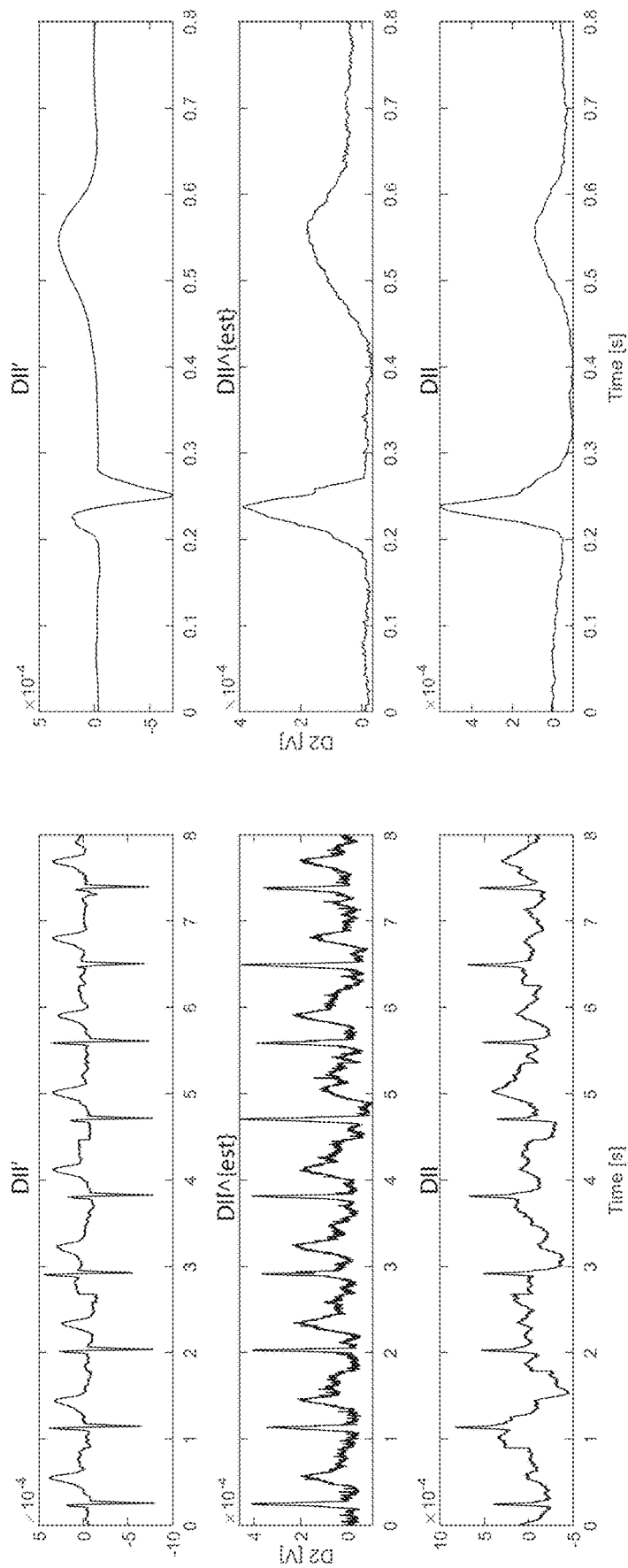
FIG. 11 shows a second lead DII' measured by the device according to the invention, the bipolar $DII^{est}$ lead, that is, the estimated classical bipolar DII lead, calculated by means of a lead algorithm according to the invention, starting from the leads measured by a device according to the invention, and the classical bipolar DII lead, measured on the same patient by means of prior art systems.
Figure 12:
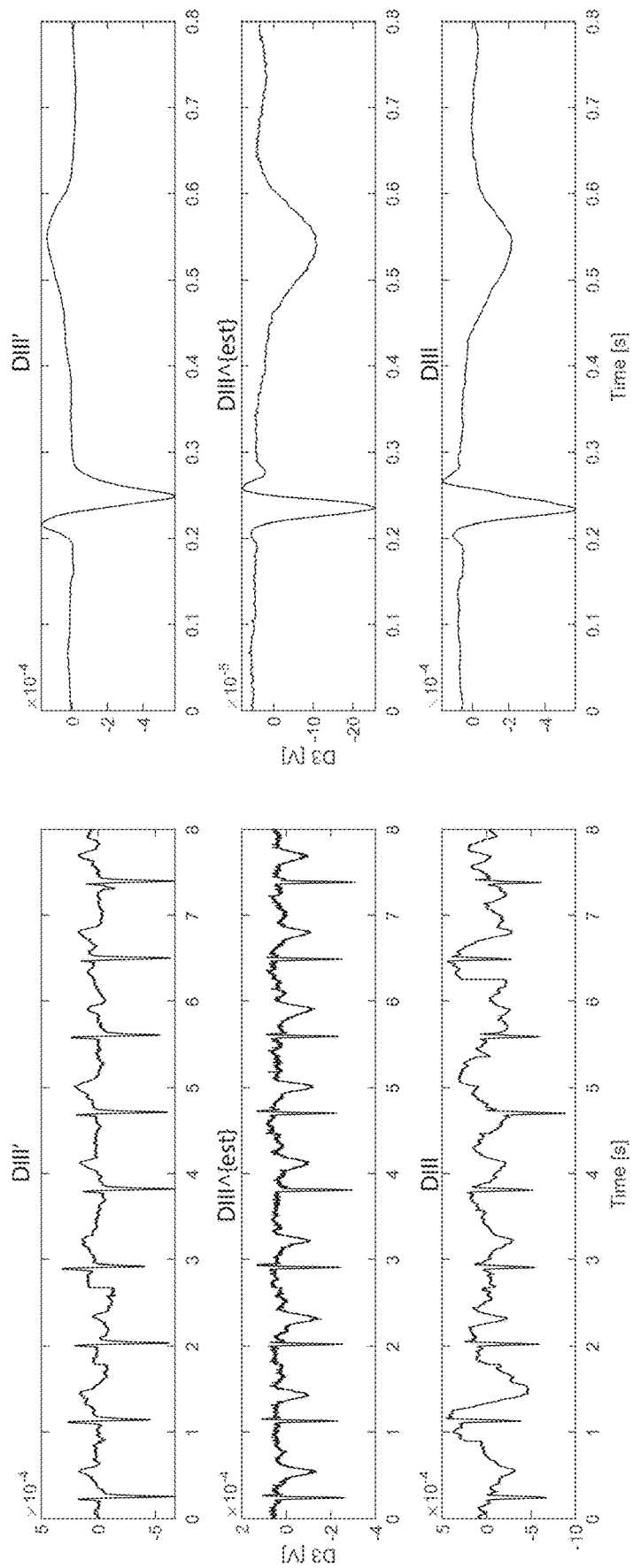
FIG. 12 shows a third lead DIII' measured by a device according to the invention, the bipolar $DIII^{est}$ lead, that is, the estimated classical bipolar DIII lead, calculated by means of a lead algorithm according to the invention, starting from the leads measured by a device according to the invention, and the classical bipolar DIII lead, measured on the same patient by means of prior art systems.
Figure 13:
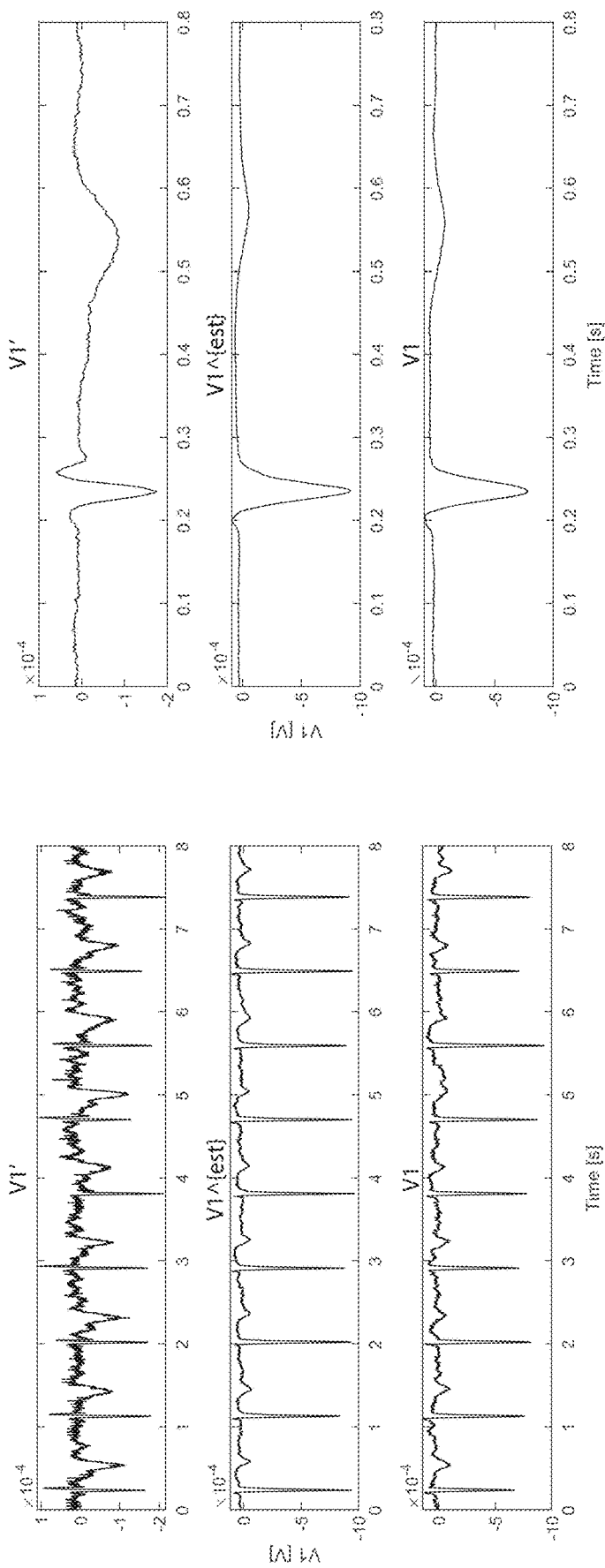
FIG. 13 shows a fourth lead V1' measured by a device according to the invention, the unipolar $V1^{est}$ lead, that is, the estimated classical unipolar V1 lead, calculated by means of a lead algorithm according to the invention, starting from the leads measured by a device according to the invention, and the classical unipolar V1 lead, measured on the same patient by means of prior art systems.
Figure 14:
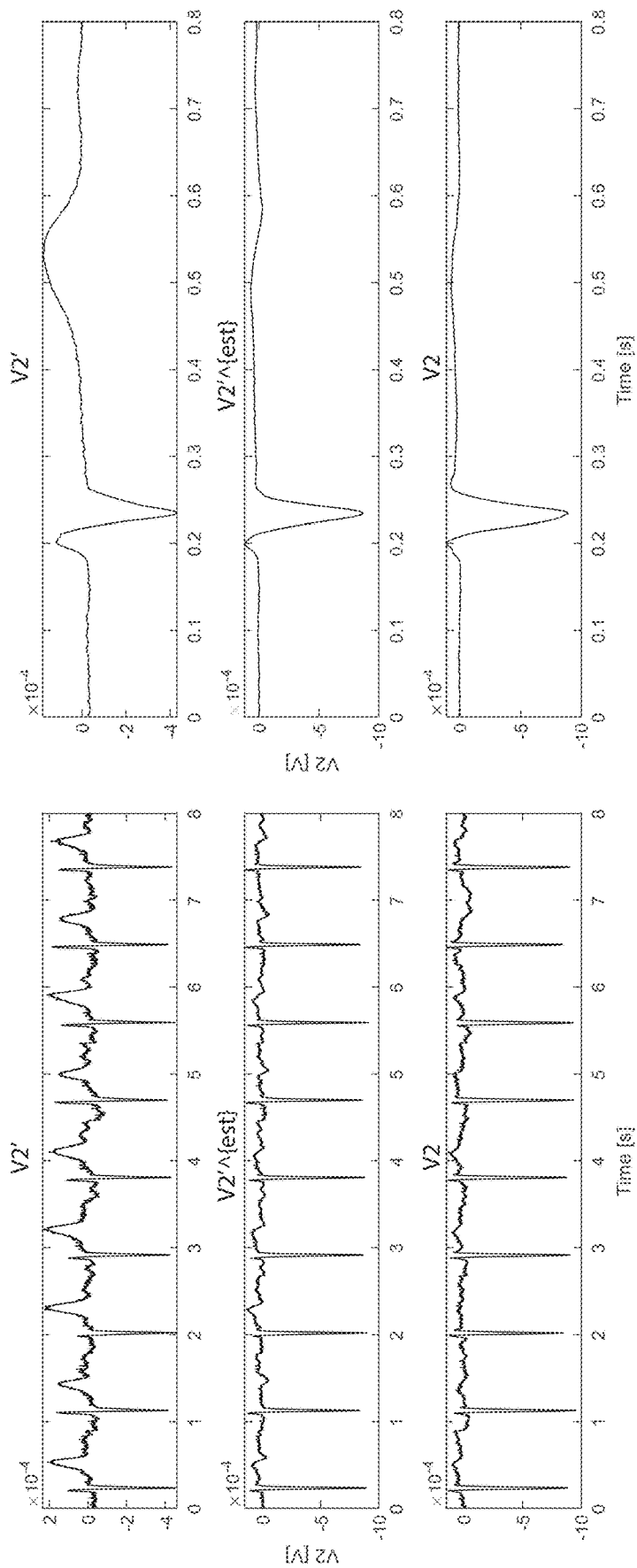
FIG. 14 shows a fifth lead V2' measured by a device according to the invention, the unipolar $V2^{est}$ lead, that is, the estimated classical unipolar V2 lead, calculated by means of a lead algorithm according to the invention, starting from the leads measured by a device according to the invention, and the classical unipolar V2 lead, measured on the same patient by means of prior art systems.
Figure 15:
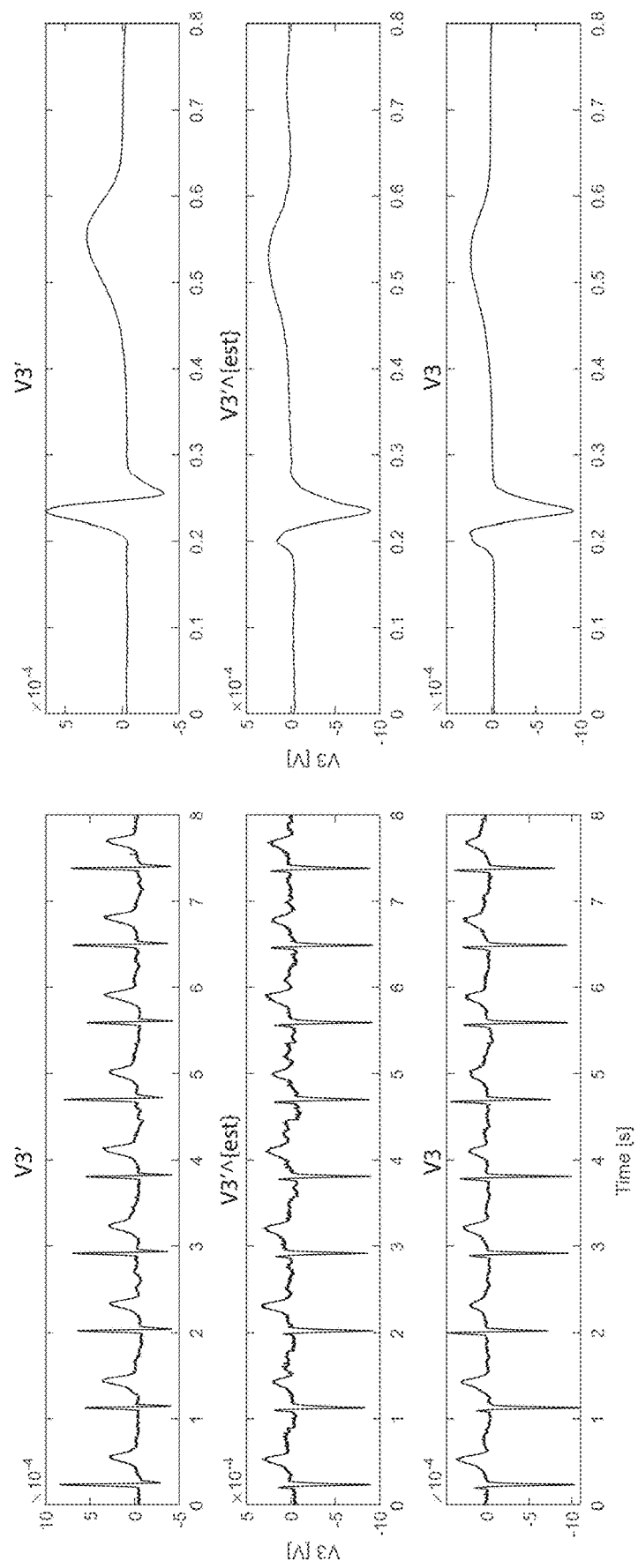
FIG. 15 shows a sixth lead V3' measured by a device according to the invention, the unipolar $V3^{est}$ lead, that is, the estimated classical unipolar V3 lead, calculated by means of a lead algorithm according to the invention, starting from the leads measured by a device according to the invention, and the classical unipolar V3 lead, measured on the same patient by means of prior art systems.
Figure 16:
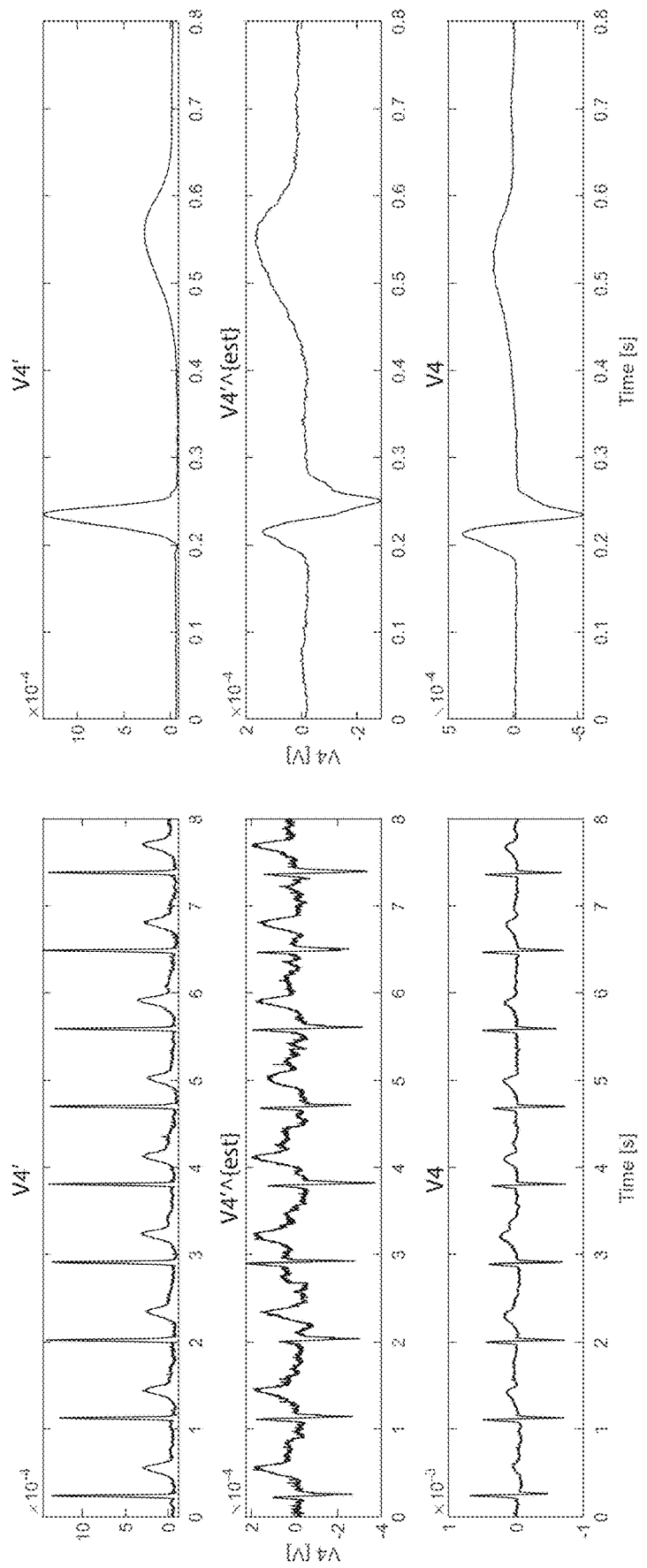
FIG. 16 shows a seventh lead V4' measured by a device according to the invention, the unipolar $V4^{est}$ lead, that is, the estimated classical unipolar V4 lead, calculated by means of a lead algorithm according to the invention, starting from the leads measured by a device according to the invention, and the classical unipolar V4 lead, measured on the same patient by means of prior art systems.
Figure 17:
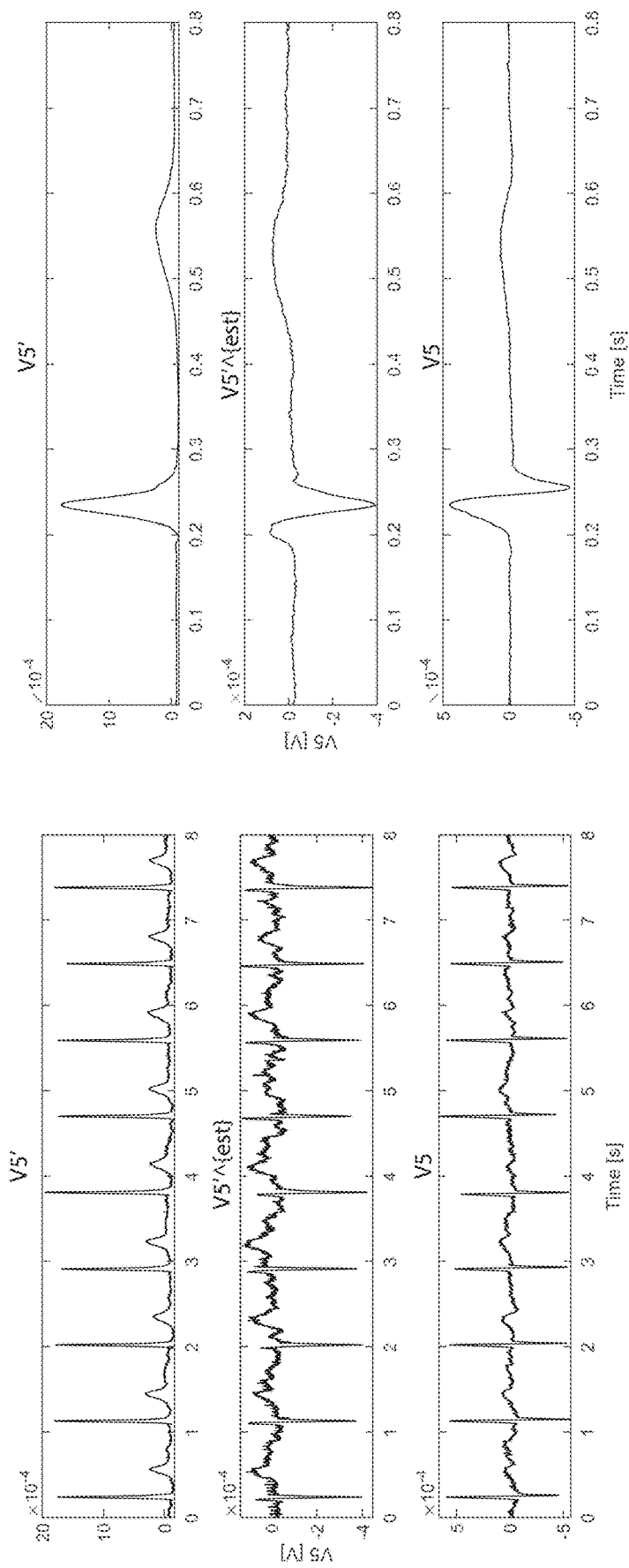
FIG. 17 shows an eighth lead V5' measured by a device according to the invention, the unipolar $V5^{est}$ lead, that is, the estimated classical unipolar V5 lead, calculated by means of a lead algorithm according to the invention, starting from the leads measured by a device according to the invention, and the classical unipolar V5 lead, measured on the same patient by means of prior art systems.
Figure 18:
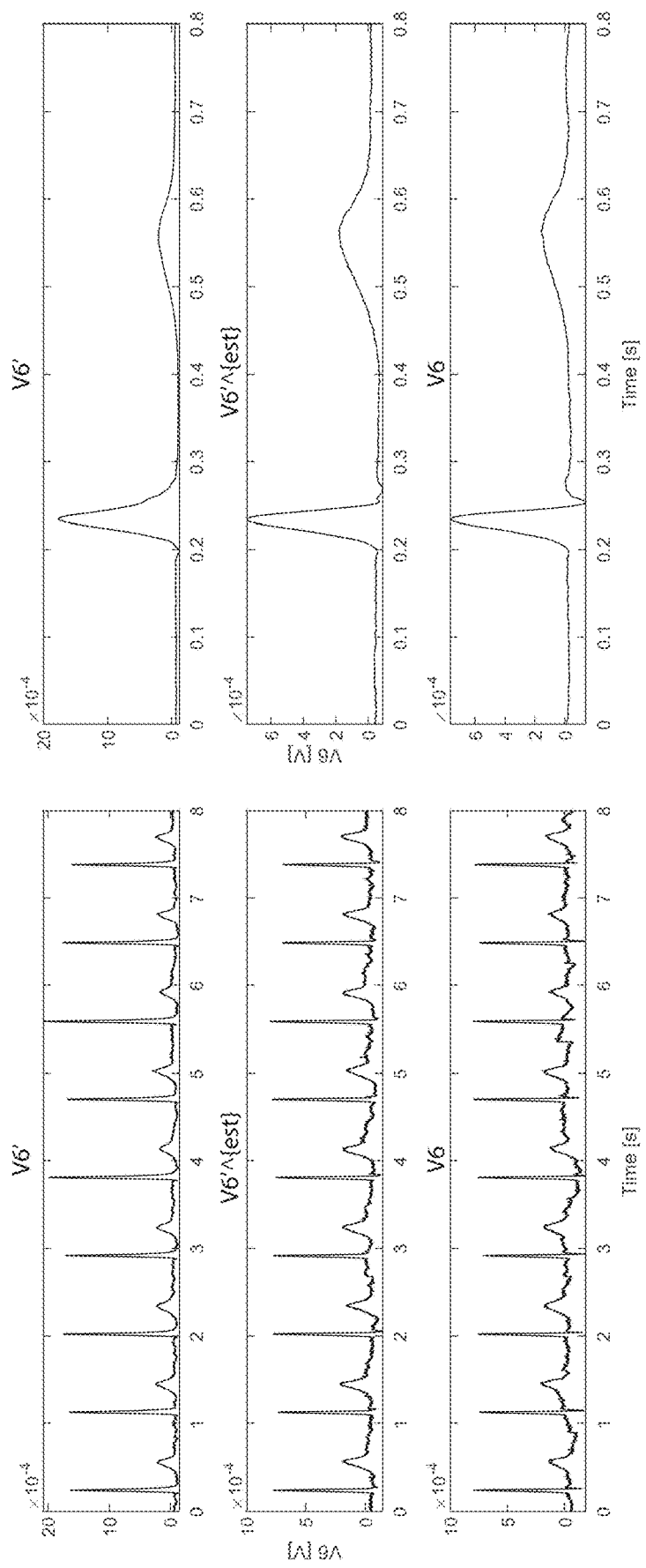
FIG. 18 shows a ninth lead V6' measured by a device according to the invention, the unipolar $V6^{est}$ lead, that is, the estimated classical unipolar V6 lead, calculated by means of a lead algorithm according to the invention, starting from the leads measured by a device according to the invention, and the classical unipolar V6 lead, measured on the same patient by means of prior art systems.

With reference in particular to FIG. 9, the detection device 1 described above may be integrated inside a system 100 for handling cardiac electrical signals of a patient.

In particular, this system 100 may comprise a receiving device 2, in particular a transceiver device 2, external to said detection device 1 and connectable to it, for example by means of said Bluetooth® transceiver means, in order to receive data from said detection device 1, store it and/or retransmit it to further devices.

The receiving device 2 may in fact be connectable to a remote central unit 3, such as, for example, an external server, in particular a cloud, or may comprise a data storage unit within itself.

In particular, the remote central unit 3 may comprise said software to filter and transform the leads acquired by the logic control unit U.

Further, both the receiving device 2 and the remote central unit 3 may be configured to transmit input data to display means 4, which are also external to said detection device 1.

Alternatively, the same receiving device 2 may comprise appropriate display media 4, such as, for example, a smart-phone.

Moreover, the data receiving device 2 may be configured to receive data from said detection device 1 in real time, or to receive data temporarily saved in the memory of the logic control unit U, whenever the receiving device 2 is located at less than a predetermined distance from said detection device 1.

As shown in FIG. 9, the receiving device 2 can be a system comprising an electrical socket for its power supply.

Moreover, the receiving device 2 may also receive as input from said detection device 1 a patient identifier, such as the patient's first and last name, and/or the date and time of data acquisition.

Moreover, the receiving device 2 can be connected to multiple detection devices 1 associated with different patients, and can be programmed to recognise the detection device 1 closest to it, associate it with the patient ID and send the acquired leads or transform together with patient-specific data to a further device 3 or 4.

Receiving device 2 can also be configured to transfer data from the patient's home to a reference diagnostic centre, such as a hospital, for example using a SIM card. In such a case, the receiver device 2 can advantageously allow the real-time display of a patient's electrocardiographic trace remotely to the relative physician.

Alternatively, the receiving device 2 may only be present within the reference diagnostic centre, and autonomously download the data recorded inside the detection device 1 only when the patient visits the diagnostic centre, to increase the efficiency of the diagnostic centre itself.

Moreover, the receiving device 2 may also be connectable to detection devices different from the detection device 1 described above.

In short, two different uses can be envisaged for the system 100 for managing a patient's cardiac electrical signals.

According to a first use, a person may use the system 100 for personal use.

In this case, the person installs the receiving device 2 at home, attaches the detection device 1 to him/herself, moves out of the communication range between the detection device 1 and the receiving device 2 and when he/she returns to the communication range the detection device 1 automatically connects to the receiving device 2 and sends the data to it, which can forward it to an external server, such as a cloud, or store it internally. Subsequently, the person can access the data stored on the server or on the receiving device 2 by connecting to it, for example by means of a PC, tablet or smart phone.

In this case, the detection device 1 will be configured to stop recording before the battery 15 is completely depleted, in such a way as to sufficient energy to transmit the data via Bluetooth to the receiving device 2 which, as mentioned, can be plugged into the electrical socket at home.

According to a second use, the detection device 1 may be applied to a patient in a hospital or other healthcare facility for continuous recording of the electrocardiographic trace for a predefined period of time, for example 24 hours.

After said predefined period of time, the patient returns to the healthcare facility to return the device and the receiving device 2 will be present in the same healthcare facility.

For this reason, as soon as the patient is within the range of the receiving device 2, the latter will automatically activate the connection with detection device 1, for example via Bluetooth®, in order to transmit the data stored in the detection device 1 to the receiving device 2 for storage, if required.

The medical personnel will verify that the data has been transmitted by, for example, connecting to the receiving device 2 or the remote central unit 3 via a terminal. For example, a specific web address may be created on the hospital's Intranet for the specific patient, through which said data can be accessed.

If the data is not transmitted correctly to the receiving device 2, for example due to the battery 15 being depleted, the logic control unit U of the detection device 1 may provide for the data to be retransmitted to the receiving device 2, for example at the same time as the battery 15 is recharged. In particular, the logic control unit U and/or the receiving device 2 may comprise a security algorithm which does not allow the name and data of said patient to be overwritten before they are completely transmitted and stored.

For this reason, a method of operation of a system 100 comprising at least the detection device 1 comprises the following steps:

A1. acquiring a first bipolar lead DI' by means of said detection device 1, between said left upper electrode 14 and said right upper electrode 13;

A2. acquiring a second bipolar lead DII', by means of said detection device 1, between said left lower electrode 12 and said right upper electrode 13;

A3. acquiring a third bipolar lead DIII', by means of said detection device 1, between said left lower electrode 12 and said left upper electrode 14; and A4. acquiring at least two unipolar leads V1', V2' between each lower electrode 11, 12 and optionally each further electrode 17-20 and the average of the signals recorded on the pair of upper electrodes 13, 14 and the left lower electrode 12 with respect to the reference potential of the right lower electrode 11.

The method may also comprise the following further step, which may be performed by said logic control unit U:

B. calculating at least one cardiac lead of a standard electrocardiogram, by a transformation of the detected cardiac leads, using a transformation function B, preferably a linear transformation using the Partial Least Square method.

Optionally, prior to step B. it is possible to preliminarily filter the input data and normalise them, in order to have a clean signal, free of any noise, to be transformed.

The method may also comprise one or more of the following steps:

C. sending said leads acquired in the previous steps and/or said at least one lead calculated in step B to said data receiving device 2; and/or D. receiving a modified transformation function, to be applied during said step B. and overwriting said pre-determined transformation function B.

The preferred embodiments have been described above and variants to the invention have been suggested, but it shall be understood that the invention may be modified and/or adapted by experts in the field without thereby departing from the scope of the inventive concept, as defined in the claims herein.

What is claimed is:

1. A detection device for detecting cardiac electrical signals, wearable by a patient, comprising
    a right lower electrode and a left lower electrode,
        for detecting cardiac electrical potentials,
        being arranged aligned with each other on a first axis, distant from each other by a first distance;
    a right upper electrode and a left upper electrode,
        for detecting cardiac electrical potentials,
        being arranged above said lower electrodes, and being arranged, aligned with each other, on a second axis, parallel to said first axis, and distant from each other by a second distance, greater than said first distance; and
    a logic control unit, electrically connected to said electrodes, wherein said logic control unit is configured to receive:
        a first bipolar lead, detected between said left upper electrode and said right upper electrode,
        a second bipolar lead, detected between said left lower electrode and said right upper electrode,
        a third bipolar lead, detected between said left lower electrode and said left upper electrode,
        a first unipolar lead, detected between said right lower electrode and a first mean potential, and
        a second unipolar lead, detected between said left lower electrode and said first mean potential,
        wherein said first mean potential is equal to the average of detected signals, with respect to a reference potential, on said right upper electrode, on said left upper electrode and on said left lower electrode.

2. The detection device according to claim 1, wherein logic control unit is configured to receive or calculate at least one of the following augmented unipolar leads:
    a first augmented unipolar lead, between said left lower electrode and a second average potential, wherein said second average potential is equal to the average of the signals detected on said right upper electrode and on said left upper electrode with respect to said reference potential;
    a second augmented unipolar lead, between said right upper electrode and a third average potential, wherein said third average potential is equal to the average of the signals detected on said left lower electrode and on said left upper electrode with respect to said reference potential; and
    a third augmented unipolar lead, between said left upper electrode and a fourth average potential, wherein said fourth average potential is equal to the average of the signals detected on said left lower electrode and on said right upper electrode with respect to said reference potential.

3. The detection device according to claim 1, wherein the pair of said right lower electrode and said right upper electrode and the pair of said left lower electrode and said left upper electrode are arranged symmetrically to each other with respect to a vertical axis, orthogonal to said axes.

4. The detection device according to claim 1, characterised
    in that the detection device comprises at least one further electrode, and
    in that said logic control unit is configured to receive at least a third unipolar lead detected between said at least one further electrode and said average potential.

5. The detection device according to claim 4, wherein at least one further electrode is connectable in a removable fashion to said logic control unit.

6. The detection device according to claim 1,
    wherein said logic control unit is configured to use the potential detected on said right lower electrode as said reference potential.

7. The detection device according to claim 1, wherein the detection device comprises a supporting element, applicable on the thorax of said patient, comprising in turn four housings for housing respectively said right lower electrode, said left lower electrode, said right upper electrode and said left upper electrode.

8. The detection device according to claim 1, wherein logic control unit is connected in a removable fashion to said supporting element.

9. The detection device according to claim 1, wherein logic control unit is configured to transform the signals acquired by said electrodes into cardiac leads of a standard electrocardiogram, by means of a predefined transformation function, wherein the transformation function is a linear function.

10. The detection device according to claim 1, wherein the detection device comprises power supply means for supplying electricity to said detection device, connected to said logic control unit, said power supply means being arranged between said right upper electrode and said left upper electrode.

11. The detection device according to claim 1, wherein the detection device comprises transceiver means for transmitting cardiac electrical signals of said patient.

12. A system for detecting and processing cardiac electrical signals from a patient, comprising
    a detection device according to claim 11, and
    a receiving device, which can be connected to said transceiver means of said detection device, said receiving device being configured to receive, transmit and/or store said cardiac electrical signals of a predefined patient.

13. The system according to claim 12,
    wherein said receiving device is a transceiver device and in that said system comprises a remote central unit which can be connected to said transceiver, configured for
        receiving cardiac electrical signals of said predefined patient from said transceiver device, and
        storing data associated with said cardiac electrical signals of said predefined patient, so as to make them available remotely, and in that said remote central unit is configured to transform the leads detected by said logic control unit into cardiac leads of a standard electrocardiogram, by means of a predefined transformation function, wherein the predefined transformation function is a linear function.

14. A method of detecting cardiac leads on a thorax of a patient by means of at least one left lower electrode, right lower electrode, left upper electrode and right upper electrode, wherein said left lower electrode and said right lower electrode are arranged respectively at the fourth right and at the fourth left intercostal spaces, on the marginal-sternal line, and said left upper electrode and said right upper electrode are arranged above said left lower electrode and said right lower electrode, being aligned on a transversal line of said thorax, wherein said left lower electrode and said right lower electrode are spaced from each other by a first distance and said left upper electrode and said right upper electrode are spaced from each other by a second distance, greater than said first distance, said method comprising the following steps:

A1. detecting a first bipolar lead, between said left upper electrode and said right upper electrode;

A2. detecting a second bipolar lead, between said left lower electrode and said right upper electrode;

A3. detecting a third bipolar lead, between said left lower electrode and said left upper electrode;

A4. detecting a first unipolar lead, between said right lower electrode and a first mean potential, and A5. detecting a second unipolar lead, between said left lower electrode and said mean potential, wherein said first mean potential is equal to the average of the signals detected, with respect to a reference potential, on said right upper electrode, on said left upper electrode and the left lower electrode;

B. estimating at least one cardiac lead of a standard electrocardiogram by means of a transformation of the detected cardiac leads, using a predetermined transformation function, wherein the transformation function is a linear function.

15. The method according to claim 14, wherein further comprising at least one of the following steps:

A6. acquiring a first augmented unipolar lead, between said left lower electrode and a second average potential, wherein said second average potential is equal to the average of the signals detected on said right upper electrode and on said left upper electrode with respect to said reference potential;

A7. acquiring a second augmented unipolar lead, between said right upper electrode and a third average potential, wherein said third average potential is equal to the average of the signals detected on said left lower electrode and on said left upper electrode with respect to said reference potential; and A8. acquiring a third augmented unipolar lead, between said left upper electrode and a fourth average potential, wherein said fourth average potential is equal to the average of the signals detected on said left lower electrode and on said right upper electrode, with respect to said reference potential.

16. The method according to claim 14, wherein predetermined transformation function in said step B. is a linear transformation function, obtained by means of the Partial Least Square method.

17. The method according to claim 14, wherein further comprising the following step:

C. sending said leads detected in the detecting steps and/or said at least one lead calculated in step B to a data receiving device.

18. The method according to claim 14, wherein further comprising the following step:

D. receiving a modified transformation function, to be applied during said step B., and overwriting said predetermined transformation function.

* * * * *